Patented May 2, 1944

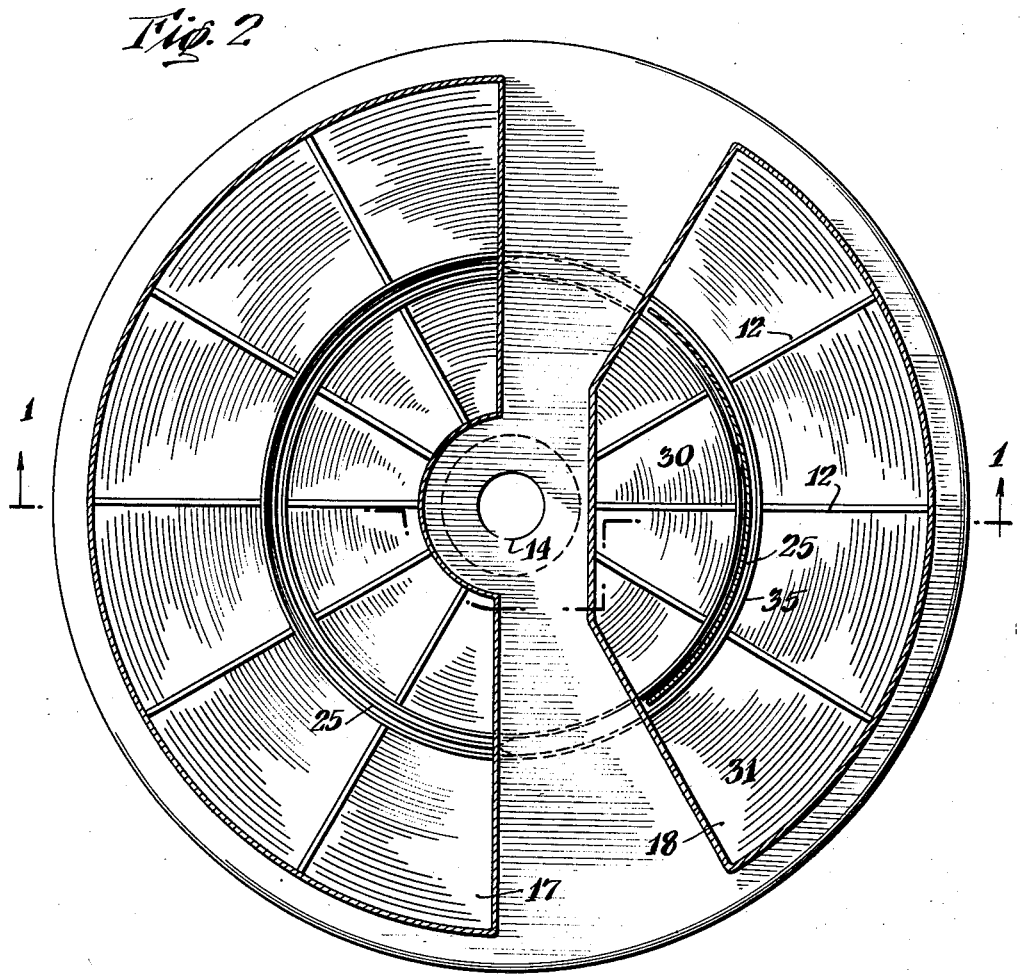
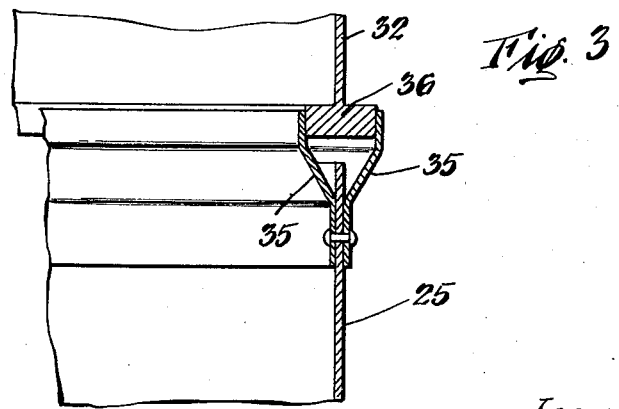

2,347,857

UNITED STATES PATENT OFFICE 2,347,857

TEMPERATURE ZONED AIR PREHEATER

Joseph Waitkus, Wellsville, N. Y., assignor to The Air Preheater Corporation, New York, N. Y.

Application October 15, 1941, Serial No. 415,047

3 Claims. (Cl. 257—6)

The present invention relates to air preheaters of the rotary regenerative type and particularly to improved means for regulating the temperature conditions in the preheater and also for deriving from the preheater volumes of air at different temperatures.

In installations where pulverized coal is fed into the furnace in a current of carrier air, it is frequently desirable to heat the primary air to a very high temperature in order to properly dry wet fuel. The secondary air required for the combustion of the fuel is generally utilized at a lower temperature and, heretofore, one procedure has been to heat all the air passing through a preheater to the highest possible temperature in order to suit primary air requirements and then to lower the temperature of the portion of the air from the preheater that is to be employed as secondary air for the combustion of the fuel by mixing cold air therewith.

In accordance with the present invention a regenerative preheater of the Ljungstrom type is provided with separate temperature zones by dividing the rotor into two independent sections through either of which air and gas may be circulated in the amounts required to obtain separate streams of air at the different temperatures desired, for example as primary and secondary air for the combustion of fuel.

A second feature of the invention is that the exit flue gas temperatures may be controlled over the full operating range of a boiler with which the preheater embodying the invention is installed so as to avoid corrosion of the plates of the preheater resulting from the flue gas temperature falling to the "dew point" when the boiler is operating at low loads. This is effected by isolating one section of the rotor at low loads with the result that the flue gases are directed over a smaller area of heating surface than at high loads.

The invention will best be understood upon consideration of the following detailed description of an illustrative embodiment thereof when read in conjunction with the accompanying drawings in which:

Figure 1 is a sectional elevation of a Ljungstrom regenerative air preheater embodying the present invention;

Figure 2 is a sectional view on the line 2—2 in Figure 1 showing the rotor of the preheater as viewed from above; and Figure 3 is a view on an enlarged scale of a sealing device appearing in Figure 1.

In the drawings the numeral 10 designates the housing of an air preheater of the Ljungstrom type having a cylindrical rotor 11 divided by radial partitions or diaphragms 12 (Fig. 2) into a plurality of sector-shaped compartments. Each rotor compartment contains regenerative heating surface in the form of substantially uniformly distributed undulated or corrugated plates 13 which first absorb heat from the hot gases when passing through the gas side of the preheater and then impart the heat to air passing through the air side as the rotor is turned slowly about its axis 14 by a motor 15 operating through suitable reduction gearing. The usual sector plates 16 provided at the ends of the housing opposite rotor 11 are formed with openings 17, 18 exposing several sector shaped compartments on both the air and gas side of the preheater so as to place the regenerative material carried by the rotor in communication with the ducts for hot gas and for air. The inlet and outlet ducts for gas are designed 20 and 21 in Figure 1 and those for air are numbered 22 and 23 respectively. The preheater construction as described above is conventional.

In carrying out the present invention, a circular partition 25 is located intermediate the shell 26 of the rotor and the rotor post 27 (Figure 1) which form the outer and inner walls of the various sector shaped compartments. Thus each compartment is divided into inner and outer sections 30 and 31 respectively. The inlet and outlet ducts 22, 23 for air and the inlet duct 20 for gas are provided with baffles or partitions 32, 33, 34 extending axially of the ducts in alinement with the partition 25 that divides the rotor into two independent sections. As shown on a larger scale in Figure 3 the two sections of each rotor compartment are sealed from each other by sealing strips 35 mounted near the ends of partition 25 and engaging an adjacent part 36 of the various partitions 32, 33, 34.

The amount of heat imparted to the volumes of air flowing through the two separate heat zones of the preheater may be varied by providing different amounts of heat transfer surface in the form of plates in a compartment section 30 as compared with that in a section 31.

Near the inlet to each subdivision of the inlet ducts 20, 22 for gas and air are dampers 37, 38.

By adjusting the dampers in the air duct or in the gas duct, or for both ducts, the total volumes of gas and air passing through the preheater may be so distributed to the inner and outer sections of the rotor that any desired primary air temperature up to the maximum possible in the preheater may be obtained.

When a boiler with which the preheater is associated is operated at low loads, either the inner or the outer sections of the rotor compartments may be cut off by closing the dampers in the gas and air ducts leading thereto so that the available volume of gas is directed over a smaller amount of heat absorbing surface. As a consequence the flow of air over such surface does not reduce the temperature to a value approaching the dew point of the flue gases thereby minimizing corrosion. This may be done because the smaller volumes of air and flue gas involved at low loads render it possible to utilize a smaller quantity of heating surface without serious detriment to operating efficiency so far as combustion of the fuel is concerned.

It will be noted that in the drawings the partition 25 is located substantially midway between the shell 26 of the rotor and the rotor post 27 which form the outer and inner walls of the various sector-shaped compartments. This is one of several possible locations for the partition 25 which, because the compartments are sector-shaped, would result in subdividing them so that the inner sections 30 are smaller than the outer sections 31. Consequently, when the plates 13 are uniformly spaced in a radial direction within the inner and outer sections of the compartments, the heating effect attained from the plates in the inner sections 30 is less than that from the plates in the outer sections 31.

What I claim is:

1. In regenerative heat exchange apparatus having passages for a heating gas and air or other gaseous fluid to be heated, ducts for supplying hot gas and relatively cool air to and for withdrawing the cooled gas and heated air from said passages, and a rotor divided by radial diaphragms into a plurality of compartments containing regenerative material adapted to be moved first through the gas passage and then into the air passage; a partition located intermediate the outer wall and the center of said rotor for dividing said compartments into inner and outer sections; baffle means disposed in the gas and air inlet ducts in alinement with said partition for sub-dividing the fluid currents therein into separate streams and directing the latter to the inner and outer sections of the rotor compartments; similar baffle means in the air outlet duct alined with said partition for maintaining separation of the air streams flowing from the rotor; and damper means in said air duct for enabling variations in the amount of air flowing through each sub-division thereof to the inner and outer sections of the rotor compartments.

2. In regenerative heat exchange apparatus having passages for a heating gas and air or other gaseous fluid to be heated, ducts for supplying hot gas and relatively cool air to and for withdrawing the cooled gas and heated air from said passages, and a rotor divided by radial diaphragms into a plurality of compartments containing regenerative material adapted to be moved first through the gas passage and then into the air passage; a partition located intermediate the outer wall and the center of said rotor for dividing said compartments into inner and outer sections; baffle means disposed in the gas and air inlet ducts in alinement with said partition for sub-dividing the fluid currents therein into separate streams and directing the latter to the inner and outer sections of the rotor compartments; similar baffle means in the air outlet duct alined with said partition for maintaining separation of the air streams flowing from the rotor; and damper means in said gas inlet duct for enabling variation in the amount of gas flowing through each sub-division thereof to the inner and outer sections of the rotor compartments.

3. In regenerative heat exchange apparatus having passages for a heating gas and air or other gaseous fluid to be heated, ducts for supplying hot gas and relatively cool air to and for withdrawing the cooled gas and heated air from said passages, and a rotor divided by radial diaphragms into a plurality of compartments containing regenerative material adapted to be moved first through the gas passage and then into the air passage; a partition located intermediate the outer wall and the center of said rotor for dividing said compartments into inner and outer sections; baffle means disposed in the gas and air inlet ducts in alinement with said partition for sub-dividing the fluid currents therein into separate streams and directing the latter to the inner and outer sections of the rotor compartments; similar baffle means in the air outlet duct alined with said partition for maintaining separation of the air streams flowing from the rotor; and damper means in said air and gas inlet ducts for enabling variation in the volumes of air and gas flowing through each sub-division of said ducts to the inner and outer sections of the rotor compartments.

JOSEPH WAITKUS.